ately used as segments in a desired application, or the pulse rise time may be decreased by segmenting the pulse so as to permit rejection of the more slowly rising leading edge.

United States Patent [19]
Horton

[11] 4,288,691
[45] Sep. 8, 1981

[54] LASER PULSE SHAPING

[75] Inventor: James A. Horton, Kennewick, Wash.

[73] Assignee: Jersey Nuclear-Avco Isotopes, Inc., Bellevue, Wash.

[21] Appl. No.: 861,941

[22] Filed: Dec. 19, 1977

[51] Int. Cl.² .................. B01D 59/44; G02F 1/16
[52] U.S. Cl. .................................. 250/281; 350/171
[58] Field of Search ............... 331/94.5 M; 332/7.51; 350/169, 171, 172; 250/251, 281; 336/4.3

[56] References Cited

U.S. PATENT DOCUMENTS

| 3,430,048 | 2/1969 | Rubinstein | 332/7.51 |
| 3,435,226 | 3/1969 | Rach | 332/7.51 |
| 3,459,466 | 8/1969 | Giordmaine | 350/169 |
| 3,879,109 | 4/1975 | Thomas | 350/169 |
| 4,035,638 | 7/1977 | Szoke et al. | 250/251 |
| 4,059,759 | 11/1977 | Harney | 332/7.51 |
| 4,174,150 | 11/1979 | Congleton | 350/171 |

FOREIGN PATENT DOCUMENTS 2253296 11/1973 France .................. 331/94.5 M

Primary Examiner—Nelson Moskowitz
Attorney, Agent, or Firm—Weingarten, Maxham & Schurgin

[57] ABSTRACT

A system for temporal pulse shaping of laser radiation beams particularly for use as photoexcitation radiation in isotope separation. Each pulse of laser radiation is temporally segmented into two or more sections. The sections may be superimposed after a delay in the leading one to augment the pulse intensity, or the segmented pulses may be separately used as segments in a desired application, or the pulse rise time may be decreased by segmenting the pulse so as to permit rejection of the more slowly rising leading edge.

19 Claims, 8 Drawing Figures

LASER PULSE SHAPING

FIELD OF THE INVENTION

The present invention relates to a system for temporal segmenting of radiation pulses and spatially separating the different segments.

BACKGROUND OF THE INVENTION

In applications for pulsed laser beams such as isotope separation and in particular uranium enrichment, examples of which are shown in U.S. Pat. Nos. 3,772,519; 3,939,354; 3,924,937; and 3,944,947, pulsed radiation is employed to produce isotopically selective photoexcitation and/or ionization of a vapor environment of the particles of plural isotope types, one or more types of which are to be separated. In providing the laser radiation pulses for this application, it is common to generate a beam of a precisely defined spectral purity to insure selective excitation and to provide amplification in one or more stages of amplifiers to a useful energy level. Laser radiation pulses generated in such a manner typically have a conventional bell-shaped pulse characteristic. The slow rise and fall shape is typically too long in duration for the period of time during which useful photoexcitation may take place, typically approximately one microsecond. The excessively slow rise time necessitates wasting or undesirable preapplication of the leading edge of the radiation pulse until a sufficient intensity for efficient photoexcitation is reached. This can result in an undesirable loss of radiation energy and efficiency.

BRIEF SUMMARY OF THE INVENTION

In accordance with the teaching of the present invention a system for temporal pulse splitting is disclosed for particular application to isotope separation by photoexcitation. The temporal splitting may be employed to increase the leading edge rise time of the pulses of laser radiation, to shorten the pulse duration and thereby provide two or more pulses from each single amplified pulse of radiation with a time duration appropriate for photoexcitation, or permit superposition after appropriate delays of the segmented pulse sections to result in an increase in laser pulse intensity.

In particular implementation, a beam of pulsed laser radiation is directed through an element which is operative to change a characteristic of the radiation in response to an electrical signal which is provided to switch the characteristic at some intermediate point during each pulse of laser radiation. The pulse thus segmented is directed to a further element which is operative to provide spatial separation of the radiation pulses based upon whether the characteristic has or has not been changed. In this manner, separate paths of radiation for each segment desired may be achieved. It is possible to segment the pulse directly subsequent to the slow rising edge thereby to produce a substantially shorter pulse with a more rapid rising edge for application to the environment which is to be selectively photoexcited. The radiation may also be segmented into two or more generally equal pulses of radiation which may then be separately directed onto two or more paths through the plural isotope environment to produce separate regions of selective photoexcitation.

In a particular embodiment, the laser radiation pulses are applied to a Pockels cell or Kerr cell which is electrically driven to rotate polarization of applied radiation 90°. The selectively rotated radiation is applied to a polarizer, such as a Glan Thompson crystal or any other low loss polarizer, in which the radiation of unshifted polarization passes through one channel of the crystal, while a 90° shift in the laser radiation polarization causes it to exit from the crystal on a different angle.

For segmenting the laser pulses into greater than two sections, a matrix of polarization rotators and polarization sensitive crystals may be employed so that three or more beams of pulsed radiation may be obtained from a single input pulse.

The segmented pulses are also time delayed to produce time coincidence and are then superimposed for increased intensity.

BRIEF DESCRIPTION OF THE DRAWING

These and other features of the present invention are more fully set forth below in the exemplary and nonlimiting detailed description and accompanying drawing of which:

FIG. 3a shows a modification to the FIG. 3 diagram;

FIG. 3b shows a waveform diagram useful in understanding the modification of FIG. 3a;

DETAILED DESCRIPTION OF THE INVENTION

Figure 1:
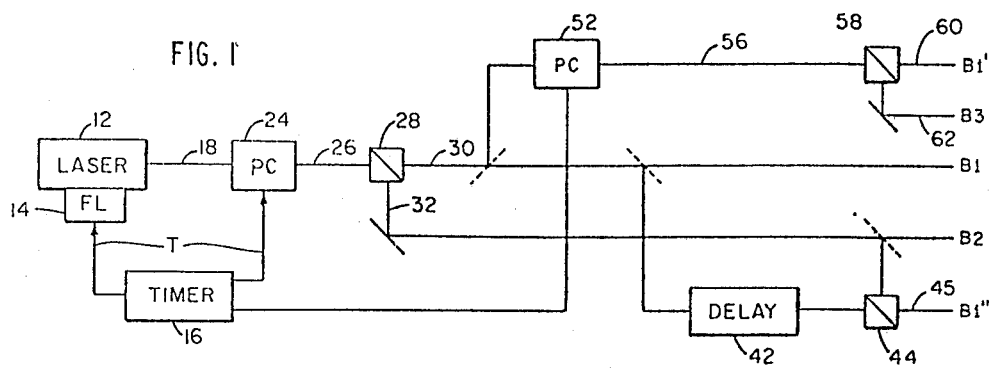
FIG. 1 is a schematic diagram of a system for providing temporal pulse splitting of pulsed radiation.

The present invention contemplates a system for segmenting pulses of radiation, typically laser radiation, to reduce the time duration of individual segments, sharpen the rise time, and/or permit superposition of the segments after time shifting into coincidence.

The purpose of segmenting such pulses of radiation has its origin in the application of laser isotope separation, typically uranium enrichment, as presented in the above-identified U.S. patents. Pulses of laser radiation generated for the purpose of pulsed photoexcitation of a vapor of plural isotope types is typically too long in duration due at least in part to the length of laser amplifier excitation radiation provided by conventional flashlamp excitation sources used for high power dye laser amplification. The result is a laser pulse duration, approximating two microseconds.

The response of the uranium vapor environment to excitation radiation is to excite a number of particles in the vapor to an excited level. In the application to isotope separation the excitation is made isotopically selective by properly tuning and band limiting the frequencies of excitation radiation.

In typical application, plural frequencies of radiation or at least plural photon interactions will be necessary to photoionize particles in the process of isotope separation outlined in the above-referenced patents and as a result excited atoms will reside in the excited state until they either spontaneously decay or are further excited or ionized. It is clearly preferable that excited particles experience the latter, i.e. further excitation or ionization rather than spontaneous decay which would mean that they were lost from the system and that the energy expended in exciting them has been wasted. It is accordingly important that radiation employed for further excitation of already excited particles be timed precisely so as to occur, with full intensity before a significant number of excited particles can decay. This necessitates among other things that the pulses of radiation employed for further excitation have a sharp rise time in contrast to the relatively slow, bell-shaped leading edge typical of pulses of laser radiation as is shown, for example, in a curve 10 in FIG. 2.

In addition, it has been found that within an interval of time significantly shorter than the typical pulse duration from dye laser amplifiers, the process of photoexcitation and photoionization in the uranium vapor, for preferred transitions, reaches most of the atoms available for photoexcitation and photoionization. This indicates that a portion of the laser radiation in each pulse is wasted.

The use of laser pulse segmenting in accordance with the present invention permits splitting the long duration pulses into shorter segments which may then be applied to separate regions of the uranium vapor for photoexcitation and photoionization thereby permitting efficient use of the energy employed in generating the laser radiation without resort to such tactics as flashlamp quenching.

Figure 2:
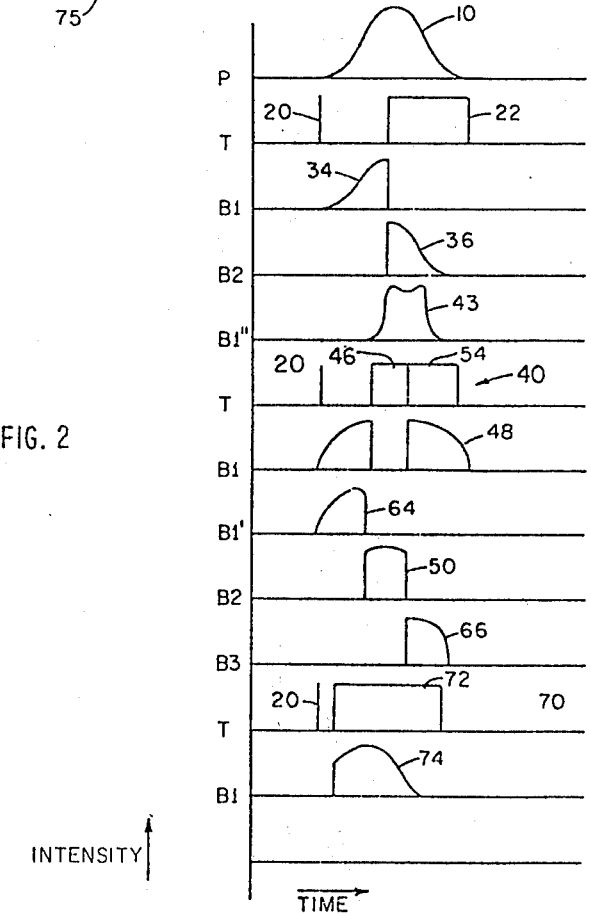
FIG. 2 is a waveform diagram illustrative of a segmenting function provided by the apparatus of FIG. 1.

The method and apparatus according to the present invention may now be best understood by reference to the drawings and in particular to FIGS. 1 and 2 which should be considered in conjunction with each other. In FIG. 1, a laser 12 is shown which is typically a tunable dye laser amplifier having a flashlamp excitation source 14 that is triggered by a timer 16 to excite the dye medium of laser 12 to a lasing condition resulting in the output of a beam 18 from the amplifier 12 of highly amplified, pulsed laser radiation. The beam 18 typically includes a series of radiation pulses of the general, time versus intensity, waveform illustrated in waveform 10 of FIG. 2.

The timer 16 is implemented to provide in addition to a time pulse 20 for activation of the flashlamp 14 as illustrated in FIG. 2, a trigger signal initiated approximately with the peak of the waveform 10 and in the form of a rectangular pulse 22 which is applied to an element 24 in FIG. 1 capable of changing a characteristic of the radiation in the beam 18 in response to the presence of the pulse 22. Typically, the element 24 is a Pockels or Kerr cell in which the polarization of the radiation in the beam 18 is rotated, typically by 90°, such that the beam 26 passing from the cell 24 is polarized the same as the beam 18 in the absence of the pulse 22 but is polarized orthogonally in the presence of the pulse 22. For this purpose, it is preferable to align the Pockels cell with respect to the polarization normally present in the beam 18 so that the rotation is optimally effective to provide a 90° polarization shift. The beam 26 is further applied to a polarization sensitive crystal 28, such as a Glan Thompson crystal, which is operative to transmit the incident radiation in beam 26 as an output beam 30 in a first polarization and to deflect it as an output beam 32 in an orthogonal polarization. The result is that the paths 30 and 32 will each receive a temporally distinct section of the segmented pulse waveform 10 as illustrated by waveforms 34 and 36 in FIG. 2. It should additionally be noted that the waveforms 34 and 36 have a duration substantially half that of the duration, at useful intensity levels, of the waveform 10. As such, the paths 30 and 32 may be applied for separate utilization in isotopically selective photoexcitation and ionization, making more efficient use of the total radiation energy under the envelope of the waveform 10. This feature and apparatus for accomplishing it is more fully illustrated below.

The radiation on the paths 30 and 32 may be superimposed by applying the waveform pulse 34 on path 30 through a delay line 42 which delays it by an amount approximately equal to one-half of the duration of the pulse 10. The delay line 42 may be a set of mirrors providing a sufficient path length to accomplish the slightly less than one microsecond delay desired. The delayed pulse may then be applied to a polarizing crystal 44 in a polarity which transmits it through to an output path 45 in combination with radiation on the path 32 which, for this purpose, is also applied to the polarizing crystal 44 along an input axis to which it is responsive at the polarization on path 32 to redirect it onto the path 45. In this manner, superimposed radiation having in general form the wave shape of envelope 43 in FIG. 2 is provided. Not only is there an increase in peak intensity, but a more rapid rise time and a more even distribution of the peak intensity radiation. Also, the pulse duration has been shortened to coincide with the time of most effective photoexcitation or ionization.

It may alternatively be desired that the timer 16 generate a set of timing signals as illustrated by the pulse train 40 in FIG. 2. As shown there, the initial pulse 20 triggers the flashlamp and a subsequent rectangular wave pulse 46 is provided to span the approximate center, peak intensity portions of the waveform in envelope 10. The result will be that the output beam 30 will correspond to the pulse of waveform 10 having a center segment removed from it as illustrated in waveform 48 while the output beam path 32 will contain the center segment as illustrated in waveform 50.

It is preferable then that the radiation on the output beam path 30 be diverted through a further Pockels or Kerr cell 52 which responds to the timer 16 and in particular to a rectangular waveform 54 illustrated in pulse train 40 and following directly subsequent to the rectangular pulse 46 so as to rotate the polarization in the second section of the two segment waveform 48. In this manner, an output path 56 from the Pockels or Kerr cell 52 will contain the pulse segments of waveform 48 in differing polarizations. A polarizing crystal 58 placed in the path 56 will then generate two separate output beams 60 and 62 corresponding to the waveforms 64 and 66 illustrated in FIG. 2. In this manner, the output beams 32, 60 and 62 will each contain different thirds of the original pulse of waveform 10. These separate paths may also be applied to isotope separation apparatus to excite separate regions of vapor.

It may additionally be possible to unequally segment the envelope 10 in accordance with the timing diagram of pulse train 70 such that very shortly subsequent to the pulse 20, initiating flashlamp discharge, a rectangular pulse 72 is generated which continues for the duration of the radiation pulse 10 producing, in the output beam 32, a radiation pulse of the form illustrated in waveform 74 of FIG. 2. As shown there, the pulse has been truncated at the rising edge to provide a rapid rise time without disturbing the remainder of the pulse. The rapid rise time is particularly useful in situations where it is desired to produce multiple excitation of particles. In this case the radiation for the first excitation step can be provided with a sharp rising edge and delayed in application until the radiation for subsequent excitation steps has reached a peak or useful intensity level.

Figure 1A:
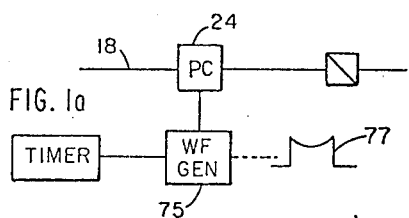
FIG. 1a shows a modification to the FIG. 1 diagram.

The Pockels cell may additionally be driven by waveforms of complex shape in order to produce certain laser pulse shapes such as a square wave. FIG. 1a illustrates such a system in which a waveform generator 75 is provided to generate a voltage drive to Pockels cell 24 of predetermined form such as waveform 77 which will vary the angular polarization shift to vary the intensity in beam 30 typically to a square wave.

Figure 3:
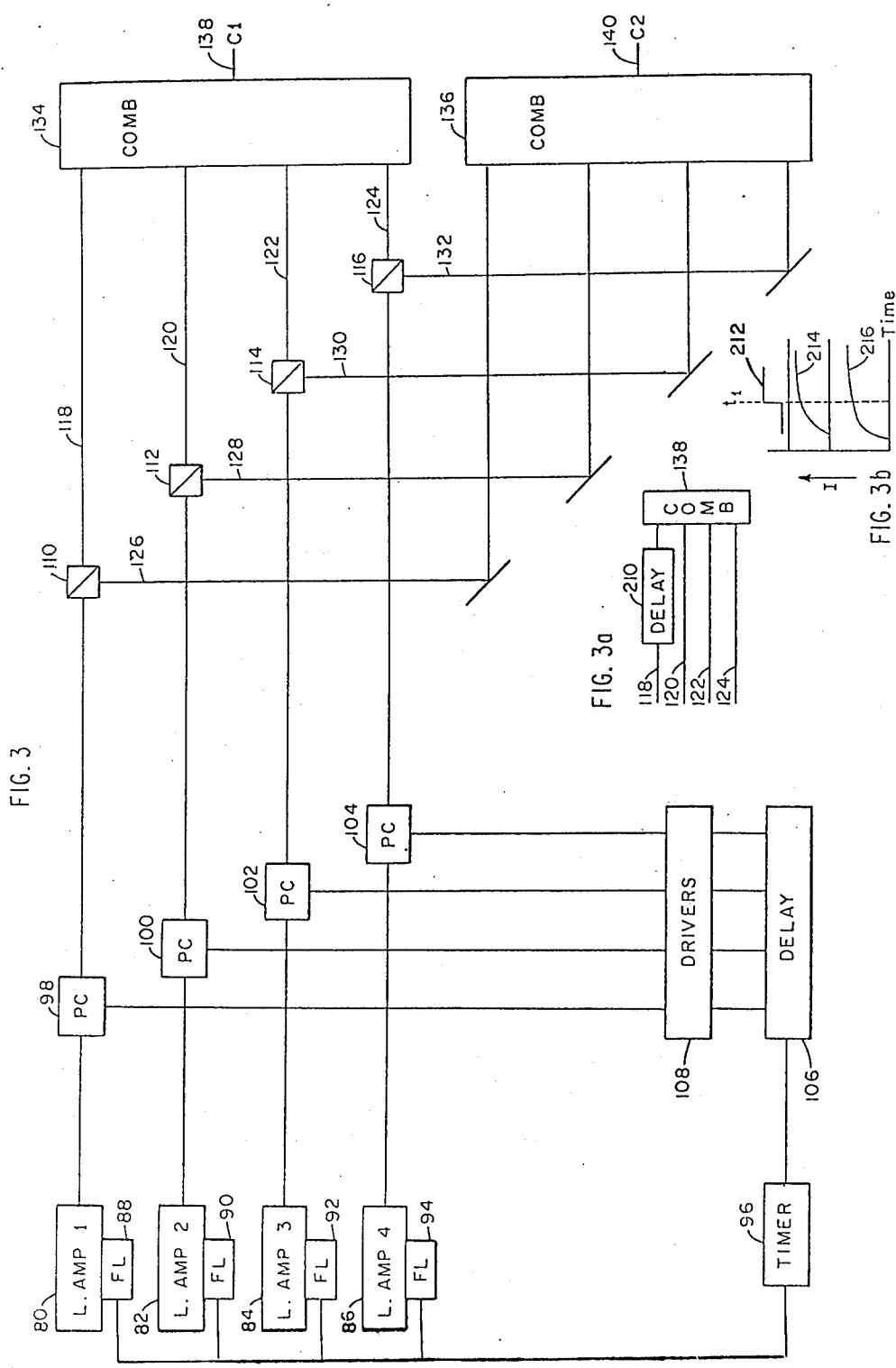
FIG. 3 is a system diagram of the use of the present invention in a set of lasers employed for isotopically selective photoexcitation.

In the application of the present invention to isotope separation and in particular to uranium enrichment, as is more fully treated in the above-referenced U.S. patents, it is typical that several colors of laser radiation be generated and corresponding laser amplifiers such as the amplifiers 80, 82, 84 and 86 illustrated in FIG. 3, each with their respective flashlamp excitation sources 88, 90, 92, and 94 be provided for the amplifiers 80-86. The flashlamps 88-94 are typically controlled by a timer 96. Normally, the timer 96 provides coincident excitation of the flashlamps 88-94 though it is contemplated that slightly staggered excitation, in the sequence in which the lasers are to be utilized to provide photoexcitation, may be employed.

The output of the laser amplifiers 80-86 is applied through respective cells 98, 100, 102, and 104 which are activated by the timer 96 through a short delay circuit 106 and driver amplifiers 108. The delay 106 is preferably employed so as to locate the rectangular pulse of the form shown in pulse 22 in FIG. 2 for switching the cells the appropriate time interval subsequent to the activating pulse for the flashlamps such as pulse 20. The outputs of the Pockels cells 98-104 are applied to respective polarizing crystals 110, 112, 114, and 116. The action of the polarizing crystals 110-116 on the radiation from the cells 98-104 results in the generation of separate output paths for each polarized segment of the radiation from the cells 98-104 onto respective sets of output paths 118, 120, 122, and 124 for one polarization, and paths 126, 128, 130, and 132 for the other polarization. The radiation on paths 118-124 is then applied to a multi-frequency radiation beam combiner 134 while the radiation paths 126-132 are applied to a multi-frequency radiation combiner 136. The multi-frequency radiation combiners 134 and 136 may be of several forms such as dichroic mirrors arranged in a matrix to combine the several frequencies. The output of the combiners 134 and 136 are respective single beam paths 138 and 140 which may be then applied to separate channels or regions of the isotope separation apparatus.

Figure 4:
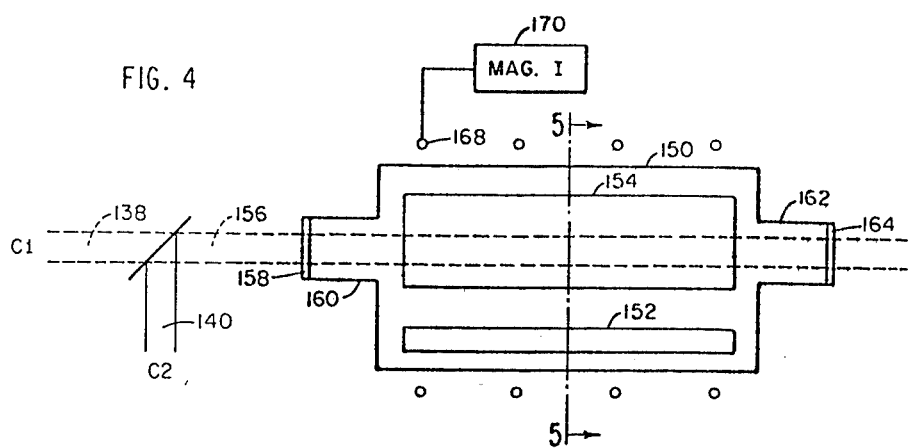
FIG. 4 is a schematic diagram of apparatus utilizing the radiation generated in FIG. 3 for selective excitation and ionization.

Apparatus for this purpose is further illustrated by reference to FIGS. 4 and 5 where, as shown in FIG. 4, a chamber 150 is provided as more fully described in the above-identified U.S. Pat. No. 3,939,354. The chamber 150 is evacuated to a low pressure of a fraction of a millitorr and has a vapor source 152, typically for uranium, which directs a vapor flow upwardly into a set of ion separator plates 154 through which radiation in beams 156, resulting from the juxtaposition of the beams 138 and 140 from the combiners 134 and 136 is applied after passing through a window 158 on an extension pipe 160. Radiation after use within the separator 154 may exit through a further pipe 162 and window 164 for further use. Surrounding the chamber 150 are a series of magnetic field coils 168 which are energized by current from a current source 170 to provide a magnetic field within the chamber 150 and in particular in the region of the vapor source 152 and ion separator 154. The magnetic field is applied axially parallel to the laser beams 156.

Figure 5:
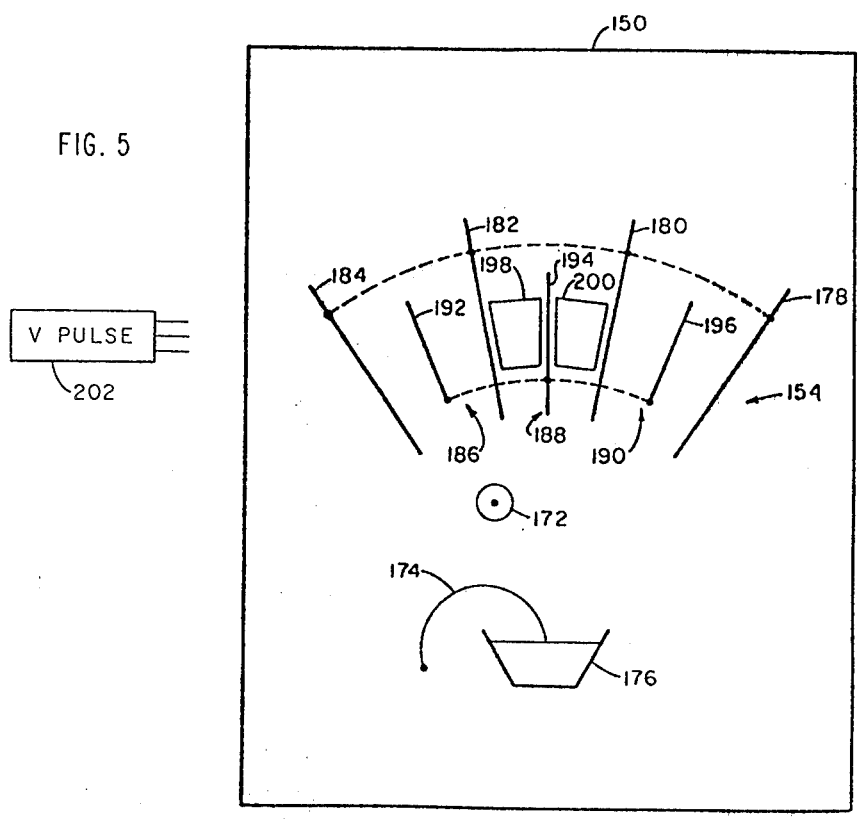
FIG. 5 is a sectional internal view of the apparatus of FIG. 4.

The interior of the chamber 150 is more fully illustrated in FIG. 5 showing a sectional view of a portion of the chamber in FIG. 4. As illustrated there, the magnetic field 172 created by the coils 168 is operative to provide a magnetic field for deflection of an electron beam 174 for application to a reservoir 176 of uranium to be evaporated and directed into the region of the ion separator plates 154. The ion separator plates 154 are shown to include a series of plates 178, 180, 182 and 184 defining chambers 186, 188, and 190. Within the chambers 186-190 further, shorter plates 192, 194 and 196 are provided sub-dividing each of the chambers into right- and left-hand sections.

The radiation in the beams 138 and 140 are typically applied in separate, adjacent or symmetric segments of the chambers such as illustrated by the regions 198 and 200.

In this manner, the radiation from a single pulse has been divided into segments which can be used to excite adjacent regions of the vapor environment within the chamber. Mirrors may be employed to reflect these beams through the regions either side of the plates 192 and 196. Three regions may be excited from a single pulse by segmenting into three sections as illustrated above.

The regions illuminated by the photoexcitation and ionization radiation will be populated by selectively ionized particles which may then be collected by pulsed application of a voltage pulse between the plates 178-184 and 192-196 from a voltage pulse source 202 connected to those respective plates and activated by the timer 96 just subsequent to the illumination in each region. For this purpose, the pulse source 202 may require several separate sources of individual pulses which are time sequenced in accordance with the timing of the radiation in the separate segments. It may accordingly be desirable to direct the radiation of different time of occurrence into different chambers 186-190. Time sequencing of the pulses may, however, be avoided by the use of delay lines in the path 140, such as the delay line 42 illustrated above with respect to FIG. 1, to provide time coincidence of all pulses.

The sequencing of the pulses of different colors may be scheduled such that the first excitation step radiation is of sharp rise time and delayed to come on only after radiation for the other steps (which will not be effective until the first step is taken) has achieved a useful intensity. A system for this purpose is shown in FIG. 3a where a delay 210 is placed in the beam 118 to delay its application an interval until the other beams reach full intensity and saturate the uranium vapor to provide delayed pulse 212 shown in FIG. 3b. Pulse 212 is delayed an interval $t_1$ from the beginning of pulses 214 and 216 for the other colors. Where the beam 118 also has a slow rise time, it is desired to separate the leading edge by a Pockels or Kerr cell technique as shown above.

It is noted that the segmenting and superimposing techniques disclosed above may further be practiced in various combinations of the disclosed structure.

The above-described preferred embodiment is intended to be exemplary only, the actual scope of the invention being defined only in accordance with the following claims.

What is claimed is:

1. A system for pulse shaping pulsed radiation employed in photoexcitation comprising:
   means defining an environment of particles;
   a source of pulsed radiation;
   means responsive to the pulsed radiation from said source for segmenting each pulse of radiation into temporally distinct segments;
   means for separating the segments onto separate paths; and
   means for applying the pulse segments on at least one of the different paths for producing photoexcitation of particles of said environment.

2. The system of claim 1 wherein said segmenting means includes means for dividing each pulse into approximately equal halves.

3. The system of claim 2 wherein said pulsed radiation source produces pulses of at least 2 microseconds duration.

4. The system of claim 1 wherein said photoexcitation producing means further includes means for producing isotope separation.

5. The system of claim 4 wherein said isotope separation means includes plural elongate channels and having the segments on different paths applied to distinct channels thereof.

6. The system of claim 1 wherein said segmenting means includes means for producing at least three segments which appear on three separate paths.

7. The system of claim 1 wherein said segmenting means includes means for pulse shaping at least one of said segments.

8. The system of claim 1 wherein said segmenting means includes means for segmenting each pulse to provide an enhanced rise time in at least one segment and in which said one segment is applied to the path for producing photoexcitation.

9. The system of claim 1 wherein:
   said segmenting means includes:
      means responsive to each pulse of radiation for producing polarization rotation thereof in response to a signal;
      means for generating said signal during each pulse; and wherein
   said means for separating includes means for separating onto said paths the radiation in each pulse in accordance with the polarization thereof.

10. The system of claim 9 wherein said rotation producing means includes a Pockels cell.

11. The system of claim 9 wherein said rotation producing means includes a Kerr cell.

12. A system for pulse shaping pulsed radiation employed in photoexcitation comprising:
   a source of pulsed radiation;
   means responsive to the pulsed radiation from said source for segmenting each pulse of radiation into temporally distinct segments;
   means for separating the segments onto separate paths; and
   means responsive to the pulse segments on at least one of the different paths for producing photoexcitation;
   said segmenting means includes means for pulse shaping at least one of said segments;
   a polarization rotator responsive to the pulsed radiation; and
   means for controlling the rotation of polarization on said polarization rotation means to provide said segment substantially in a square waveform.

13. A system for pulse shaping pulsed radiation employed in photoexcitation comprising:
   a source of pulsed radiation;
   means responsive to the pulsed radiation from said source for segmenting each pulse of radiation into temporally distinct segments;
   means for separating the segments onto separate paths; and
   means responsive to the pulse segments on at least one of the different paths for producing photoexcitation;
   at least one further source of pulsed radiation with the radiation applied to said photoexcitation producing means; and
   wherein said segmenting means provides a segment for application to said photoexcitation producing means with an enhanced rise time leading edge occurring a fraction of the pulse duration subsequent to the leading edge of the radiation pulse of said at least one further source.

14. The system of claim 13 further including means for controlling the rotation of polarization on said polarization rotation means to provide said segment substantially in a square waveform.

15. A system for pulse shaping pulsed radiation employed in photoexcitation comprising:
   a source of pulsed radiation;
   means responsive to the pulsed radiation from said source for segmenting each pulse of radiation into temporally distinct segments;
   means for separating the segments onto separate paths; and
   means responsive to the pulse segments on at least one of the different paths for producing photoexcitation;
   said segmenting means includes means for segmenting each pulse to provide an enhanced rise time in at least one segment and in which said one segment is applied to the path for producing photoexcitation;
   a polarization rotator responsive to the pulsed radiation;
   means for controlling the rotation of polarization on said polarization rotation means to provide said segment substantially in a square waveform.

16. A system for pulse shaping pulsed radiation employed in photoexcitation comprising:
   a source of pulsed radiation;
   means responsive to the pulsed radiation from said source for segmenting each pulse of radiation into temporally distinct segments;
   means for separating the segments onto separage paths; and
   means responsive to the pulse segments on at least one of the different paths for producing photoexcitation;
   said segmenting means include means for segmenting each pulse to provide an enhanced rise time in at least one segment and in which said one segment is applied to the path for producing photoexcitation.
   at least one further source of pulsed radiation with the radiation thereof applied to said photoexcitation producing means; and
   wherein said segmenting means provides a segment for application to said photoexcitation producing means with an enhanced rise time leading edge occurring a fraction of the pulse duration subsequent to the leading edge of the radiation pulse of said at least one further source.

17. The system of claim 16 further including means for causing at least one segmented radiation pulse to be delayed in application to the photoexcitation producing means whereby its leading edge occurs therein during the other of the plural pulses.

18. A system for pulse shaping pulsed radiation employed in photoexcitation comprising:
 a source of pulsed radiation;
 means responsive to the pulsed radiation from said source for segmenting each pulse of radiation into temporally distinct segments;
 means for separating the segments onto separate paths; and
 means responsive to the pulse segments on at least one of the different paths for producing photoexcitation;
 a plurality of the segmenting and separating system wherein each respective radiation source provides a different frequency of radiation; and
 plural means each responsive to the corresponding segments of plused radiation of different colors for superimposing one upon the other for application to said photoexcitation producing means.

19. A system for pulse shaping pulsed radiation employed in phtoexcitation comprising:
 means defining an environment of particles having a characteristic time for being photoexcited;
 a source of pulsed radiation;
 the pulse duration of which is substantially longer than said characteristic time;
 means responsive to the pulsed radiation from said source for segmenting each pulse of radiation into temporally distinct segments, each shorter than the pulse duration provided by said source;
 means for separating the segments onto separate paths; and
 means responsive to the pulse segments on at least one of the different paths for producing photoexcitation of particles of said environment.

* * * * *